(12) United States Patent
Ryan et al.

(10) Patent No.: US 6,267,347 B1
(45) Date of Patent: Jul. 31, 2001

(54) ACOUSTIC MOUNT

(76) Inventors: Peter Anthony Ryan, 13 Bluegum Avenue, Penrith. N.S.W. 2750.; Geoff Grimish, 65 Martin Crescent, Milperra. N.S.W. 2214., both of (AU)

(*) Notice: Subject to any disclaimer, the term of this patent is extended or adjusted under 35 U.S.C. 154(b) by 0 days.

(21) Appl. No.: 09/412,660

(22) Filed: Oct. 8, 1999

(51) Int. Cl.[7] .................................................. F16M 13/00
(52) U.S. Cl. ............................ 248/562; 248/610; 52/145
(58) Field of Search ..................................... 248/562, 608, 248/609, 610; 52/145, 506.05, 513, 144, 506.06; 267/141, 153, 293

(56) References Cited

U.S. PATENT DOCUMENTS

| | | | |
|---|---|---|---|
| 5,310,276 | * 5/1994 | Bergers et al. | 403/349 |
| 5,318,282 | * 6/1994 | Schaefer | 267/136 |
| 5,335,893 | * 8/1994 | Opp | 248/635 |
| 5,609,329 | * 3/1997 | Scholl | 267/141 |
| 5,651,535 | * 7/1997 | David | 267/140.5 |
| 5,984,283 | * 11/1999 | Tsuiki et al. | 267/33 |
| 6,029,942 | * 2/2000 | Daddis, Jr. et al. | 248/635 |

* cited by examiner

Primary Examiner—Anita King
Assistant Examiner—Naschica Morrison
(74) Attorney, Agent, or Firm—Kinney & Lange, P.A.

(57) ABSTRACT

Disclosed is a device which drastically reduces transmission of low frequency vibrations from one region to another. The device is particularly useful in the building industry and in use, is placed in a network between wall structures of adjacent rooms. The device is easy to install and can be modified to suit particular applications.

18 Claims, 4 Drawing Sheets

Section A. A.

ACOUSTIC MOUNT

TECHNICAL FIELD

The present invention is concerned with acoustic mounting devices that may be used in any application requiring acoustic isolation of one part from another.

BACKGROUND ART

In many instances, it is desirable to isolate one part of a construct from vibrations originating in another part of the construct. Even in cases where the two parts are essentially separate but for a small number of connection points, the vibrations may still be transferred via these connection points.

In vehicles for example, the driver/passenger cabin needs to be isolated from vibrations generated by the engine. Similarly, some scientific instruments consist of a sensor and a motor used for positioning the sensor. The sensor may need to be isolated from vibrations emanating from the motor so that measurements taken by the sensor are not affected by the vibrations. In multidwelling complexes, the rooms should ideally be acoustically isolated so that noises originating from one room are not heard in adjacent rooms.

Building structures conventionally have living spaces separated by block wall, which generally consist of concrete slabs. A thinner, lighter wall surface such as plasterboard is often used to cover the block wall and is mounted so as to leave a gap between the thinner wall and the block wall. This spacing is maintained by mounting brackets arranged in a network which also serve to attach the thinner wall to the block wall.

A significant problem with the above arrangement is that low frequency vibrations and sounds are easily transmitted from one thin wall, through the mounting brackets and the block wall, through to the thin wall disposed on the other side of the block wall.

One method of reducing noise and vibration transmission between rooms involves coating the mounting brackets with a sound absorbing material such as a rubber material, which serves to dampen the sound.

These sound absorbing mounts are expensive to manufacture because they involve stamping the sound absorbing material onto the actual mount structure. The layer of sound absorbing material coating the mount is quite thin, and although it does reduce the amount of noise transferred between rooms, it is still not entirely effective.

It is an object of the present invention to provide an effective acoustic mount which is of simpler construction than the prior art.

SUMMARY OF THE INVENTION

According to a broad aspect of the present invention, there is provided an acoustic mount for isolating a first part from acoustic vibrations existing in a second part.

The acoustic mount includes a mounting clip, a sound absorbing insert or plug and a bush. The mounting clip has an orifice for receiving the sound absorbing insert. The insert also has an orifice for receiving the bush, such that when the acoustic mount is fully assembled, the bush is not in direct contact with the mounting clip.

Preferably, the orifice in the mounting clip includes a single start thread, and the sound absorbing insert has an externally threaded portion which cooperates with the single start thread of the mounting clip to allow the insert to be screwed into position. This provides for a convenient and secure method of assembling the device.

Advantageously, the diameter of the head of the bush should be greater than the diameter of the orifice in the mounting clip, so that in the event of fire, the bush is prevented from slipping through the orifice of the mounting clip if the sound absorbing insert melts, thus preventing collapse of the wall structure.

Acoustic mounts of the present invention have the advantage that they are cheaper to manufacture than conventional mounts, have superior sound absorbing qualities over conventional mounts, are easy to assemble on site and it may be used in conjunction with other structures.

The invention sets out to provide a useful alternative to the conventional mounts described above, and to ameliorate, if not entirely suppress low frequency noise transmission between two parts of a particular construct.

BRIEF DESCRIPTION OF THE DRAWINGS

A preferred embodiment of the present invention will be described, with reference to the accompanying drawings, in which;

Referring to FIG. 1, acoustic mount 10 includes mounting clip 1, sound absorbing insert 2, and bush 3.

Figure 1:
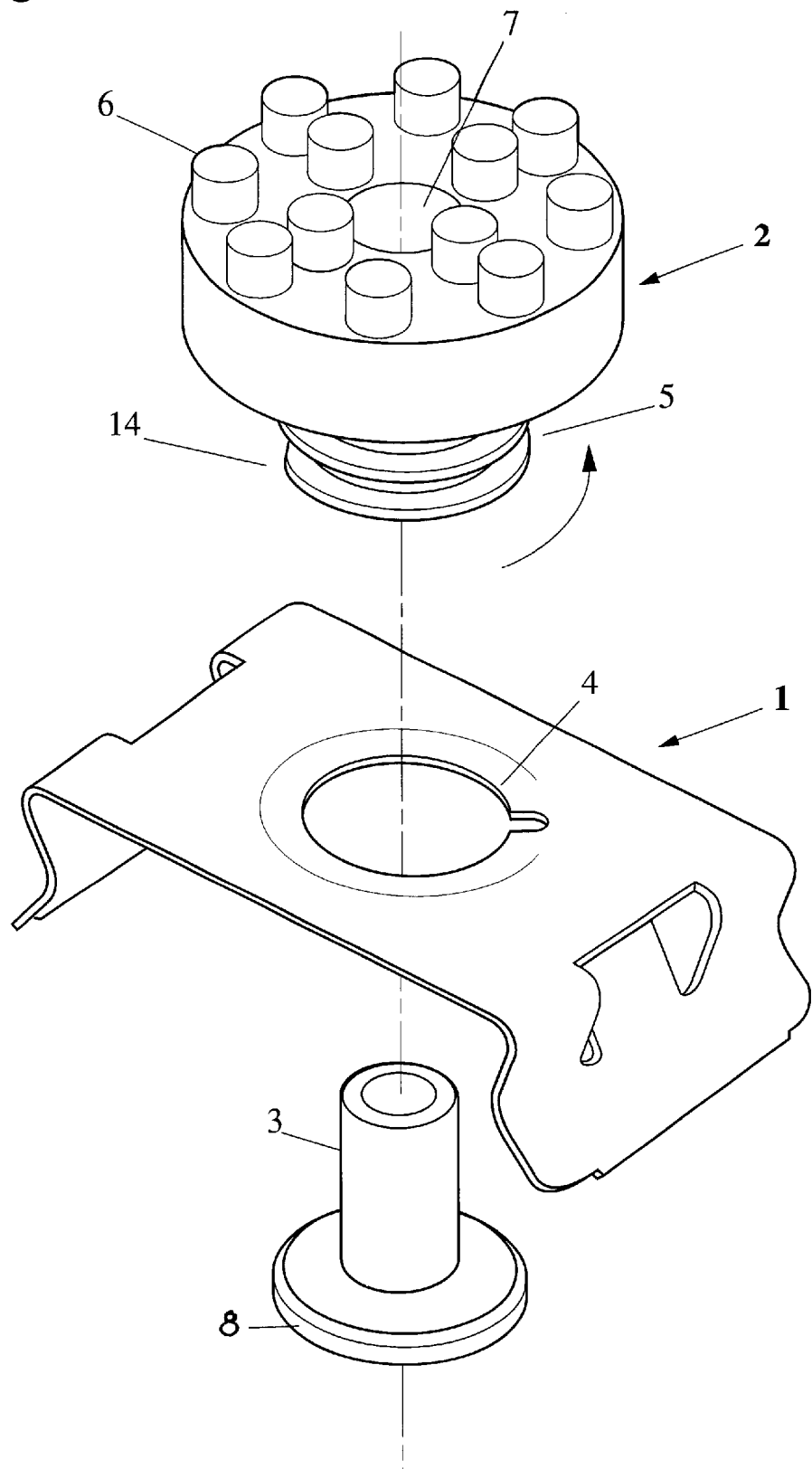
FIG. 1 shows an exploded perspective view of the main components making up an acoustic mount in accordance with the present invention.

The mounting clip 1 has an orifice 4, for receiving the sound insert 2. In this particular embodiment, orifice 4 is defined by a single start interior thread, which cooperates with a counterpart single thread 5 formed on the periphery of mounting stub 14 of sound absorbing insert 2. Alternatively, orifice 4 could simply be a plain opening, and mounting stub 14 of sound absorbing insert 2 that is received within the opening may be smooth, allowing the sound absorbing insert to be pushed into the orifice like a plug and will be held in place by the resilience of the insert 2. Other arrangements allowing the sound absorbing insert to be received within orifice 4 of the mounting clip and fixed therein are also possible. The mounting clip may be made from hardened steel, or any other suitable material and may be made into any suitable shape, such as a right angled bracket.

The sound absorbing insert 2 also has an orifice for receiving the bush. Dimples 6 on the sound absorbing insert 2 are known in the art and serve only to form a convenient surface for connecting the acoustic mount to other devices in use. The surface of the insert can take any convenient form.

The sound absorbing insert is made of a soft rubber, but may also be made of any suitable sound absorbing material.

The arrangement of the invention allows for the rubber used for absorbing the sound to be softer than the rubber used in conventional devices (e.g. rubber stamped onto the clip). This provides for more effective sound absorbing properties.

Bush 3 is in use inserted into the orifice 7 of the sound absorbing insert 2, such that it is physically isolated from the mounting clip 1.

In use, the mounting clip 1 is either directly or indirectly in contact with the thin wall or plaster board, while the bush 3 is indirectly in contact with the block wall. The sound absorbing insert 2 therefore acts to isolate the thin wall from the block wall, and dampens low frequency noise transfer between the two walls.

Figure 2:
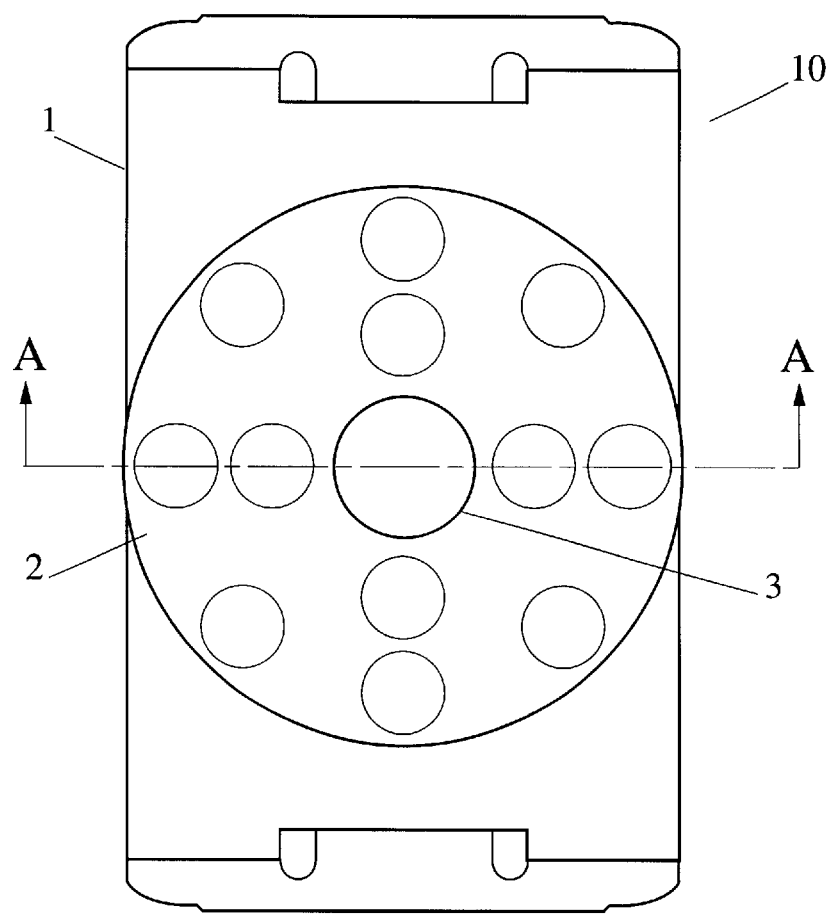
FIG. 2 is a plan view of the acoustic mount of FIG. 1 in a fully assembled state.

FIG. 2 shows the acoustic mount 10 in its assembled state. This clearly shows how the bush 3 and the clip 1 are separated by the sound absorbing insert 2.

Figure 3:
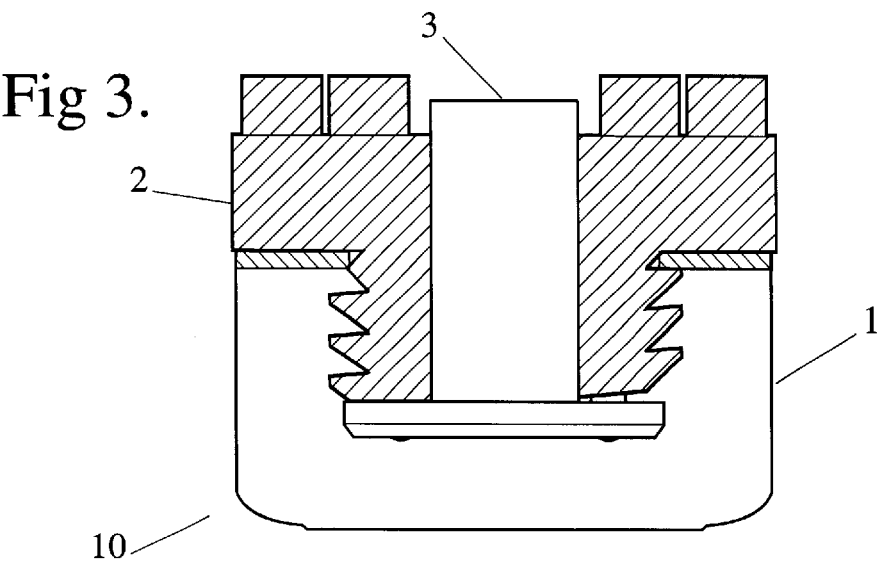
FIG. 3 is a section view taken along the line AA of FIG. 2.

FIG. 3 also shows the assembled mount 10, this time in a cross-sectional view taken along line AA in FIG. 2. Bush 3 is inserted into the orifice of the sound absorbing material 2, which sound absorbing material 2 has been previously inserted into the orifice 4 of the mounting clip 1, thereby isolating bush 3 from the clip 1.

Figure 4:
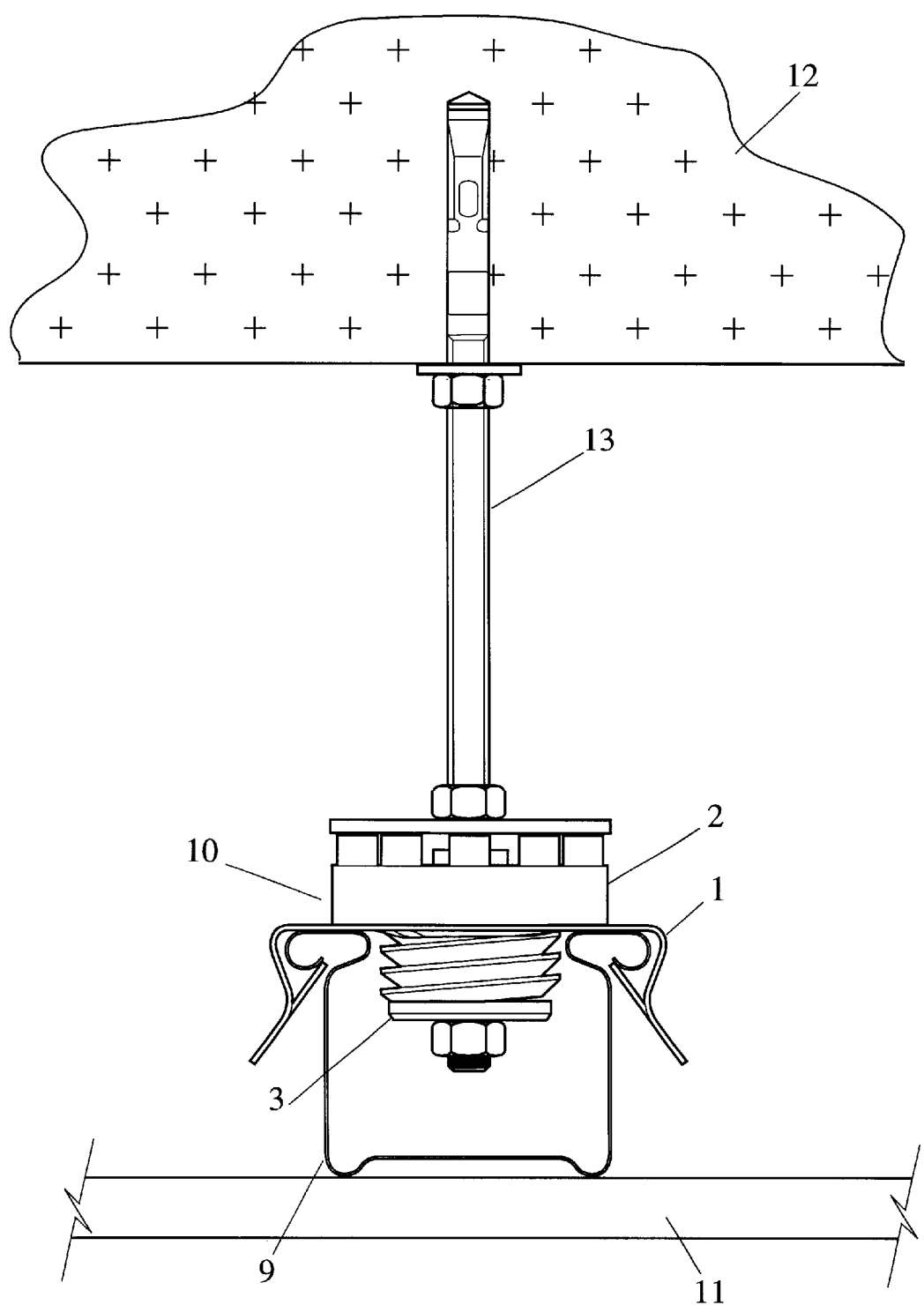
FIG. 4 is a view of the acoustic mount of FIG. 1 in use, supporting a section of plasterboard in relation to a concrete slab.

Referring now to FIG. 4, there is shown the acoustic mount in use. The mounting clip 1 of assembled mount 10 is connected to a furring channel 9, which is in turn connected to the plasterboard wall 11. It is to be emphasised that the shape of the mounting clip is not limited to that shown in this particular embodiment. The shape will vary according to the particular application.

The bush 3 is connected in a conventional manner to a connector 13, which is in turn attached in a conventional manner to concrete slab 12, making up the block wall.

Thus, noise vibrations emanating from plasterboard 11 caused by noise originating in a first room, will be transferred through the furring channel 9, to the mounting clip 1, but will be damped through the sound absorbing insert 2, effectively isolating bush 3, connector 13 and the concrete slab 12 from noises produced in the first room.

A similar arrangement exists on the opposite side of the concrete slab, thus further isolating a second room (next door to the first room) from sounds originating in the first room and vice versa.

In practice, such mounting devices are arranged in a network connecting the inner surface of the plasterboard to the concrete slab.

Figure 5:
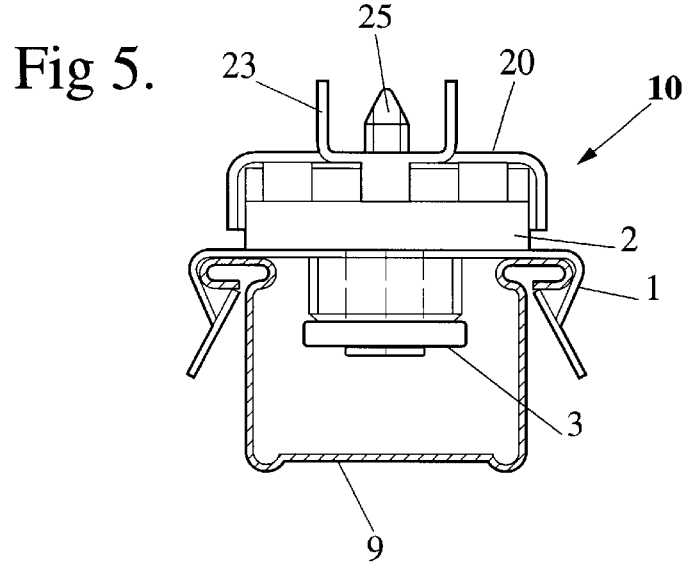
FIG. 5 is a front view of an acoustic mount according to the present invention having an alterative connector element to that shown in FIG. 4.
Figure 6:
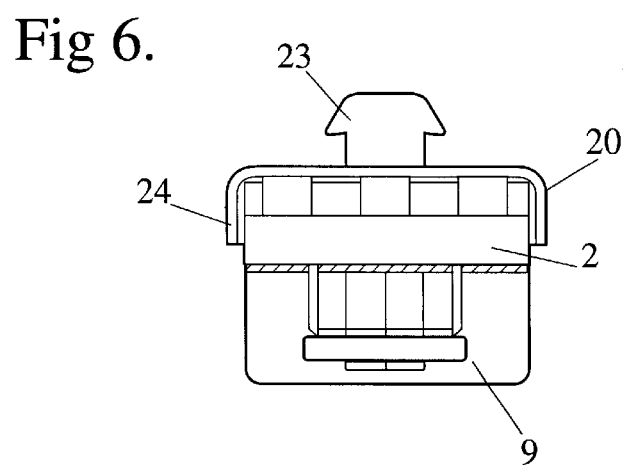
FIG. 6 is a side view of the acoustic mount with alternative connector element of FIG. 5.
Figure 7:
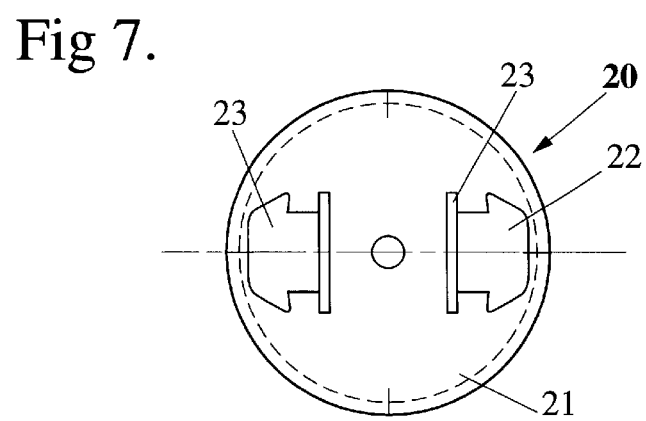
FIG. 7 is a plan view of the acoustic mount with alternative connector element of FIGS. 5 and 6.

As an alternative to connector 13, there may be provided a connector cap as shown in FIGS. 5 to 7. This allows acoustic mount 10 to be attached in a different manner to specific mounting units instead of directly to a wall. In this preferred embodiment, connector cap 20 consists of a circular dish 21 having side walls 24. Connector cap 20 may be attached to acoustic mount 10 by way of bolts or screws (not shown). Of course any other suitable means of attachment is possible.

Sections 22 are cut out from the surface of disc 21 and bent upwards to form tabs 23 which are received in corresponding slots in a mounting unit used in this particular application (not shown). Projection 25 is also received in a corresponding hole or recess in the mounting unit.

Other forms of connecting acoustic mount 10 to other mounting units are envisaged as would be understood by the person skilled in the art.

In a preferred embodiment, the diameter of head 8 of bush 3 will be greater than the diameter of orifice 4 of mounting clip 1. In the event of a fire, which may cause sound absorbing insert 2 to melt, the bush will not fall through orifice 4. This will help to prevent the wall structure from collapsing, making it safer for firefighters and persons who may be trapped in the burning building.

It will be appreciated that variations and additions are possible within the general inventive concept of this disclosure.

We claim:

1. An acoustic mount for isolating a first part of a building structure from acoustic vibrations existing in a second part of a building structure, said acoustic mount including:
    a mounting clip operatively adapted to be in contact with said first part of the building structure;
    a sound absorbing insert; and
    a bush operatively adapted to be structurally connected to said second part of the building structure;
    wherein said mounting clip includes an orifice for operatively receiving at least part of the sound absorbing insert, and wherein said sound absorbing insert has an orifice for operatively receiving at least a part of said bush, such that said bush is not in direct contact with said mounting clip.

2. An acoustic mount as defined in claim 1, wherein the orifice in said mounting clip is defined by a single start thread.

3. An acoustic mount as defined in claim 2, wherein said sound absorbing insert has a helical thread which cooperates with said start thread of said mounting clip.

4. An acoustic mount as defined in claim 1 wherein said bush has a head, the diameter of the head being greater than the diameter of the orifice of said mounting clip.

5. An acoustic mount as defined in claim 2 wherein said bush has a head, the diameter of which is greater than the diameter of the orifice of said mounting clip.

6. An acoustic mount as defined in claim 3 wherein said bush has a head, the diameter of which is greater than the diameter of the orifice of said mounting clip.

7. An acoustic mount as defined in claim 3 wherein the helical thread of the sound absorbing insert enters the mounting clip from a first direction, and the bush enters the mounting clip from a second direction that is opposite to the first direction.

8. An acoustic mount as defined in claim 1 wherein the acoustic mount is operatively adapted to be positioned inside and between parts of the building structure to minimize transmission of vibration between the parts.

9. An acoustic mount as defined in claim 1 wherein the sound absorbing insert is provided with projecting dimples which are adapted to connect indirectly to the second part of the building stucture.

10. An acoustic mount as defined in claim 1 wherein the mounting clip is operatively adapted to be in indirect contact with the first part of the building structure.

11. An acoustic mount as defined in claim 1 wherein the bush is operatively adapted to be in indirect contact with the second part of the building structure.

12. An acoustic mount as defined in claim 1, wherein the first part of the building structure and the second part of the building structure are walls extending in parallel, spaced planes, wherein the orifice of the mounting clip extends in an orifice plane, wherein the mounting clip is operatively adapted to be in contact with said first part of the building structure such that the orifice plane extends in a parallel relationship between parallel, spaced planes of the walls of the building structure.

13. An acoustic wall structure for minimizing transmission of sound waves, the acoustic wall structure comprising;

a first wall;

a second wall extending parallel to the first wall and spaced from the first wall;

a mounting clip attached to the first wall, the mounting clip having an insert receiving orifice;

a sound absorbing insert, the sound absorbing insert being at least partially received by the insert receiving orifice of the mounting clip, the sound absorbing insert having an bush receiving orifice; and a bush attached to the second wall, the bush being at least partially received by the bush receiving orifice of the insert such that the bush is not in direct contact with the mounting clip.

14. The acoustic wall structure of claim 13, wherein the sound absorbing insert has a helical thread which cooperates with the insert receiving orifice of the clip.

15. An acoustic wall structure of claim 13, wherein the sound absorbing insert enters the mounting clip from a first direction, and the bush enters the mounting clip from a second direction that is opposite to the first direction.

16. The acoustic wall structure of claim 13, wherein the first wall is plaster board.

17. The acoustic wall structure of claim 13, wherein the second wall is a concrete block wall.

18. The acoustic wall structure of claim 13, wherein the insert receiving orifice extends in an orifice plane in a parallel relationship between the parallel, spaced first and second walls.

* * * * *

UNITED STATES PATENT AND TRADEMARK OFFICE
CERTIFICATE OF CORRECTION

PATENT NO.    : 6,267,347 B1
DATED         : July 31, 2001
INVENTOR(S)   : Peter Anthony Ryan et al.

It is certified that error appears in the above-identified patent and that said Letters Patent is hereby corrected as shown below:

<u>Title page,</u>
Item [22] Filed: delete "October 8, 1999", insert -- October 5, 1999 --

Signed and Sealed this

Twentieth Day of August, 2002

Attest:

JAMES E. ROGAN
Attesting Officer    Director of the United States Patent and Trademark Office